US011760487B2

(12) United States Patent
Goswami et al.

(10) Patent No.: US 11,760,487 B2
(45) Date of Patent: Sep. 19, 2023

(54) CEILING MOUNTED TRAY SYSTEMS

(71) Applicant: B/E Aerospace, Inc., Winston Salem, NC (US)

(72) Inventors: Biplav Bijoy Goswami, Guwahati (IN); Girish Channakeshavrao Hirekerur, Bengaluru (IN)

(73) Assignee: B/E Aerospace, Inc., Winston Salem, NC (US)

( * ) Notice: Subject to any disclaimer, the term of this patent is extended or adjusted under 35 U.S.C. 154(b) by 0 days.

(21) Appl. No.: 17/589,987

(22) Filed: Feb. 1, 2022

(65) Prior Publication Data
US 2022/0242567 A1 Aug. 4, 2022

(30) Foreign Application Priority Data

Feb. 1, 2021 (IN) .............................. 202141004340

(51) Int. Cl.
| | |
|---|---|
| *B64D 11/00* | (2006.01) |
| *B65G 17/20* | (2006.01) |
| *B65G 17/34* | (2006.01) |
| *B65G 17/48* | (2006.01) |

(52) U.S. Cl.
CPC .......... *B64D 11/0007* (2013.01); *B65G 17/20* (2013.01); *B65G 17/34* (2013.01); *B65G 17/485* (2013.01); *B65G 2201/0258* (2013.01)

(58) Field of Classification Search
None
See application file for complete search history.

(56) References Cited

U.S. PATENT DOCUMENTS

| | | | | |
|---|---|---|---|---|
| 1,606,627 A | * | 11/1926 | Gromer | ................... A47F 10/06 186/47 |
| 3,102,607 A | * | 9/1963 | Roberts | ................... B61D 37/00 186/40 |
| 3,558,086 A | | 1/1971 | Kraly | |
| 3,999,630 A | | 12/1976 | McPhee | |
| 5,031,861 A | | 7/1991 | Wojdylo | |

(Continued)

FOREIGN PATENT DOCUMENTS

| | | |
|---|---|---|
| CN | 109552827 A | 4/2019 |
| GB | 2388098 B | 2/2006 |

OTHER PUBLICATIONS

Extended European Search Report dated Jun. 8, 2022, issued during the prosecution of European Patent Application No. EP 22154505.6, 4 pages.

*Primary Examiner* — William R Harp
(74) *Attorney, Agent, or Firm* — Locke Lord LLP; Scott D. Wofsy; Alicia J. Carroll

(57) ABSTRACT

A ceiling-mounted delivery assembly for a cabin of a vehicle includes a conveyance system that has a pair of guide rails, and a trolley operatively connected to the conveyance system for movement relative thereto. The trolley includes a control box having a pair of wheels. Each wheel is operatively connected to a respective one of the pair of guide rails. The control box includes a plurality of pulley drums extending from the control box. The trolley includes cable connection system having a plurality of cables. Each cable attached to a respective one of the pulley drums of the control box. The trolley includes a tray operatively connected to the cables of the cable connection system to be moved up and down relative to the control box.

20 Claims, 7 Drawing Sheets

(56) References Cited

U.S. PATENT DOCUMENTS

| | | | |
|---|---|---|---|
| 6,644,441 B1 | 11/2003 | Ebrahimi | |
| 8,371,527 B2 | 2/2013 | Girlich | |
| 9,463,926 B2 | 10/2016 | Guering | |
| 9,706,860 B2 * | 7/2017 | Li | B65G 47/36 |
| 10,549,855 B2 | 2/2020 | Augustyniak | |
| 2008/0087767 A1 | 4/2008 | Scott | |
| 2013/0199402 A1 | 8/2013 | Ansar | |
| 2017/0101182 A1 | 4/2017 | Brown et al. | |
| 2018/0370634 A1 | 12/2018 | Augustyniak | |

\* cited by examiner

CEILING MOUNTED TRAY SYSTEMS

CROSS-REFERENCE TO RELATED APPLICATIONS

This application claims priority to Indian Provisional Patent Application No 202141004340, filed Feb. 1, 2021 the disclosure of which is incorporated by reference herein in its entirety.

BACKGROUND

1. Field

The present disclosure relates to refreshment service on commercial aircraft carriers, and more particularly to refreshment tray, such as those found on commercial aircraft.

2. Description of Related Art

Many commercial aircraft include a trolley used by the flight attendants to serve food and beverages for the passengers. The traditional trolleys used in aircrafts to serve refreshments have limitations with mobility, as it is heavier to push around and blocks the aisle way. During turbulence, there is a risk of traditional trolleys hurting the passengers leading to accidents, posing question on safety. Additionally, serving refreshments to passenger poses a logistical challenge, as large trolley has to be used even for isolated/one-off serving request.

The conventional techniques have been considered satisfactory for their intended purpose. However, there is an ever present need for improved systems and methods for more direct and safer refreshment service. This disclosure provides a solution for this need.

SUMMARY

A ceiling-mounted delivery assembly for a cabin of a vehicle includes a conveyance system that has a pair of guide rails, and a trolley operatively connected to the conveyance system for movement relative thereto. The trolley includes a control box having a pair of wheels. Each wheel is operatively connected to a respective one of the pair of guide rails. The control box includes a plurality of pulley drums extending from the control box. The trolley includes cable connection system having a plurality of cables. Each cable attached to a respective one of the pulley drums of the control box. The trolley includes a tray operatively connected to the cables of the cable connection system to be moved up and down relative to the control box.

In some embodiments, the conveyance system includes a housing bolted to and extending from a ceiling of a cabin wherein the guide rails are mounted to the housing. The control box can include a housing and a drive axle extending therethrough. Each wheel of the pair of wheels is attached to an opposite end of the drive axle. The control box can include a pair of pulley axles extending through the housing. Each pulley axle can include one of the plurality of pulley drums at opposing ends thereof. The control box can include a drive assembly operatively connected to at least one of the drive axle or the pair of pulley axles. The drive assembly can be configured and adapted to rotate at least one of the drive axle or the pair of pulley axles. Each guide rail can have at least one of an I-shape, an L-shape or a C-shape.

In some embodiments, the drive assembly includes an electric motor and a pair of belt drives, wherein the pair of belt drives are operatively connected to the pair of pulley axles for providing rotation thereto. The drive assembly can include an electric motor and a wheel belt drive. The wheel belt drive is operatively connected to the drive axle for providing rotation thereto. The drive assembly can include a motor controller and an electric motor. The motor controller is configured and adapted to control operation of the electric motor. The drive assembly can include a force sensor system configured and adapted to detect abnormal G-forces. The force sensor system can be in electrical communication with the motor controller. When G-forces reach a given threshold, the tray can be retracted upwards by winding up one or more cables to preserve safety for passengers and crew and reduce likelihood of injury or damage during high-turbulence situations.

In some embodiments, the pair of wheels of the trolley are tapered from small to large in an outward direction relative to the housing. The pair of guide rails can include at least one arcuate portion. The control box can include a housing and ultra-violet (UV) lights. The UV lights can be mounted between the housing and the tray to provide sanitization or decontamination to the tray. Each of the cables includes a hook. Each hook is configured and adapted to removably connect to a respective portion of the tray.

In accordance with another aspect, a vehicle cabin includes a cabin ceiling, a ceiling-mounted delivery assembly. The ceiling-mounted delivery assembly includes a conveyance system mounted to the cabin ceiling. The conveyance system including a pair of guide rails. The ceiling-mounted delivery assembly includes a trolley operatively connected to the conveyance system for movement relative thereto. The trolley includes a control box having a pair of wheels, each wheel operatively connected to a respective guide rail of the pair of guide rails, and a plurality of pulley drums extending from the control box. The trolley includes a cable connection system including a plurality of cables, each cable attached to a respective one of the pulley drums of the control box. The trolley includes a tray operatively connected to the cables of the cable connection system to be moved up and down relative to the control box.

In some embodiments, the conveyance system including a housing that forms a track in the cabin interior. The track can have at least one arcuate portion.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
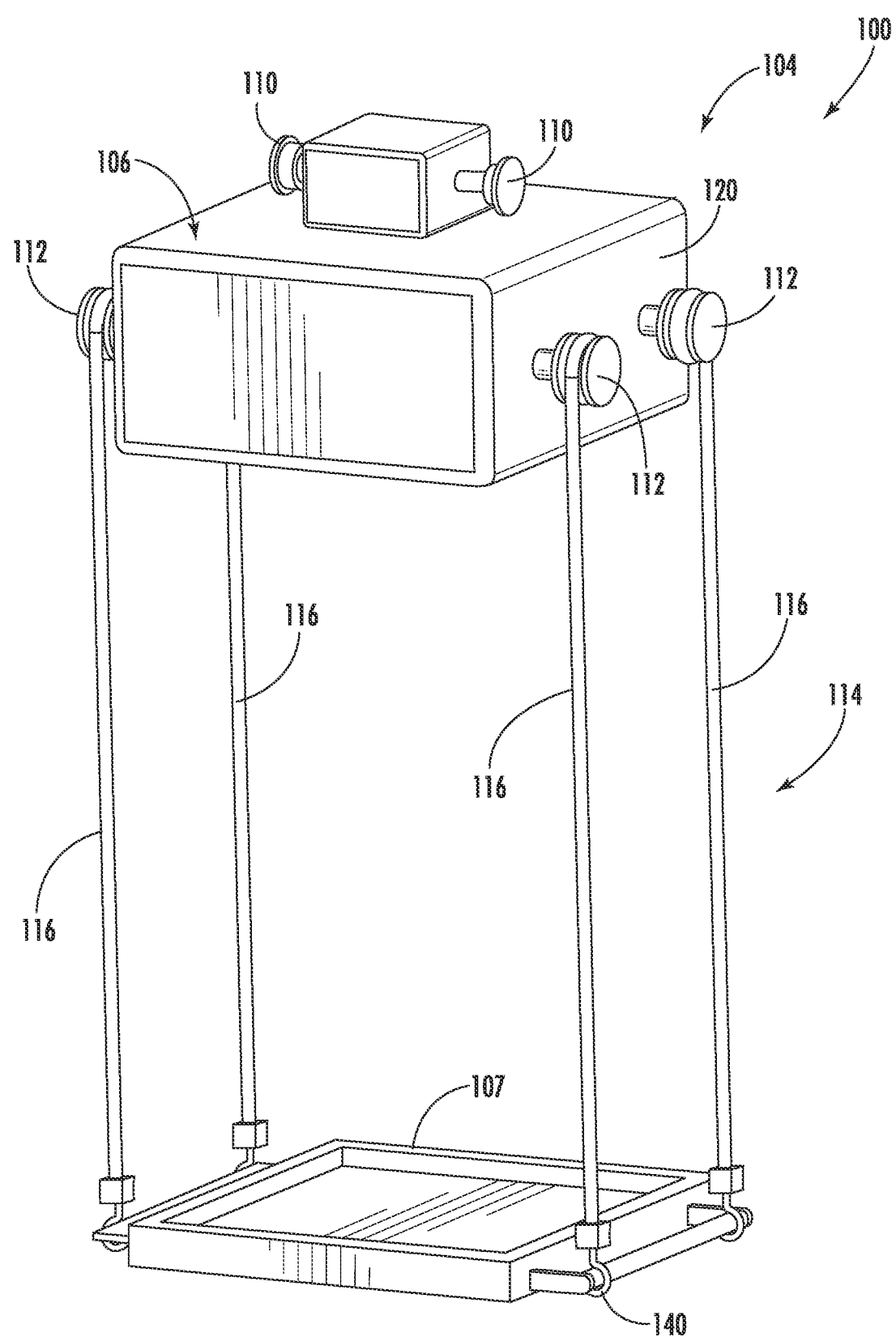
FIG. 1 is a schematic perspective view of partial view of an embodiment of a ceiling-mounted delivery assembly constructed in accordance with the present disclosure, showing the trolley with the tray in an extended position.

Reference will now be made to the drawings wherein like reference numerals identify similar structural features or aspects of the subject disclosure. For purposes of explanation and illustration, and not limitation, a partial view of an embodiment of a ceiling-mounted delivery assembly in accordance with the disclosure is shown in FIG. 1 and is designated generally by reference character 100. Other embodiments of systems in accordance with the disclosure, or aspects thereof, are provided in FIGS. 2-7 as will be described. The systems and methods described herein can provide a delivery assembly, e.g. a delivery assembly for meals, newspapers, souvenirs food and the like, that is less intrusive on aisle space and lighter than traditional trolleys. Assembly 100, described below, is easier to operate/move along the aisle as it is supported by two set of rollers on the ceiling. In case of passenger movement, the tray system can be raised-up/retracted by cables to allow movement.

Figure 2:
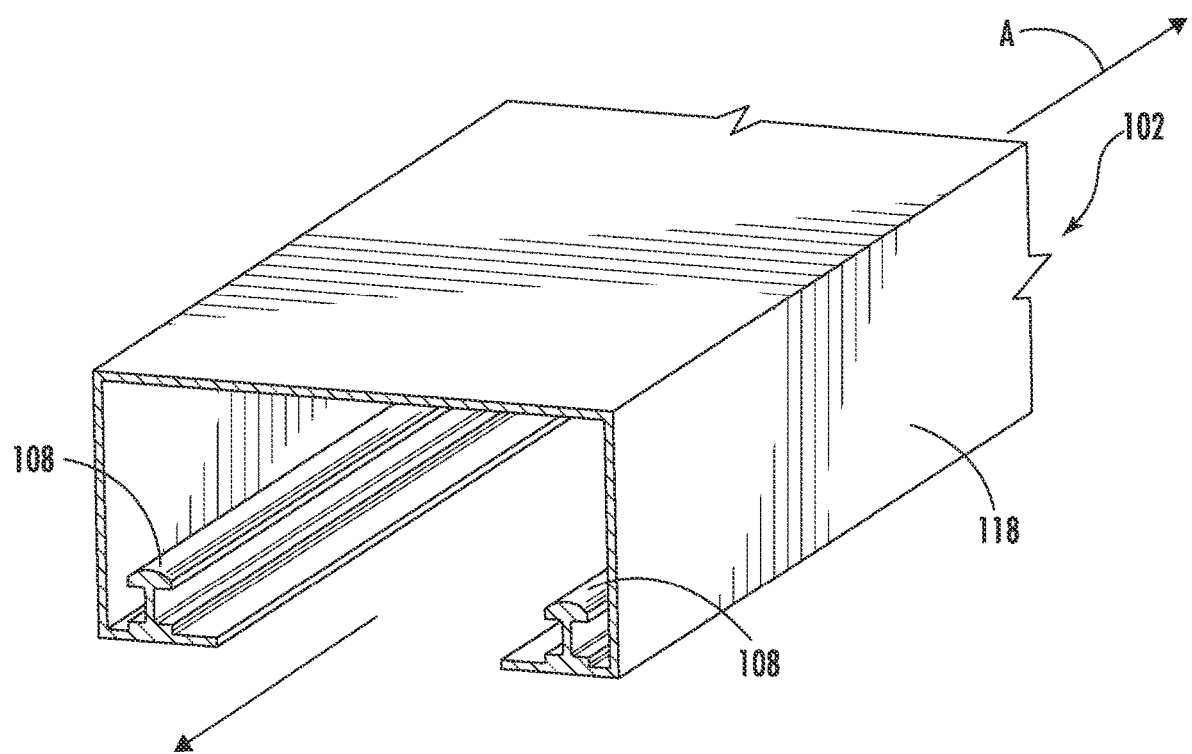
FIG. 2 is a schematic perspective view of the conveyance system of an embodiment of a ceiling-mounted delivery assembly constructed in accordance with the present disclosure, showing the guide rails.
Figure 3:
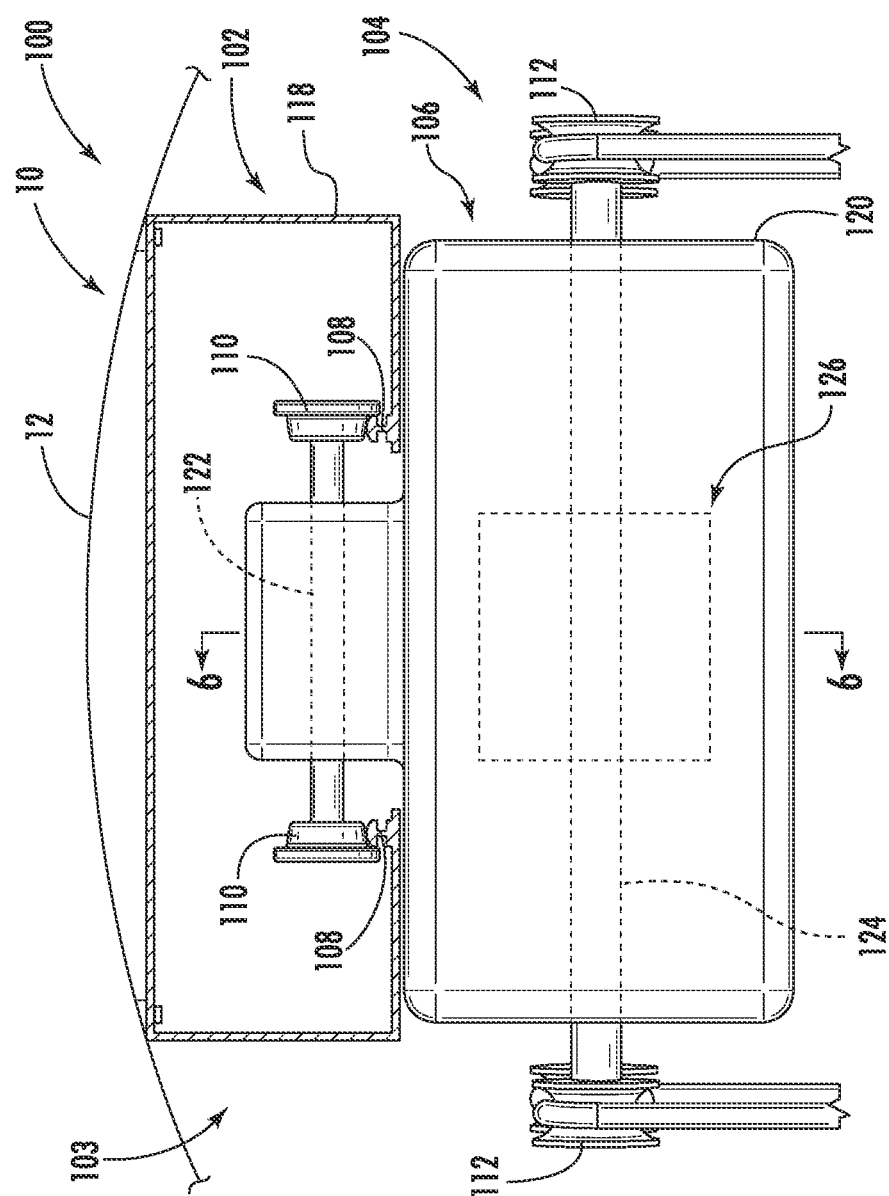
FIG. 3 is a schematic front plan view of a portion of the trolley of FIG. 1 and the conveyance system of FIG. 2, showing the wheels of the trolley on the guide rails.

As shown in FIGS. 1-3, a vehicle cabin 10, e.g. an aircraft cabin, includes a cabin ceiling 12 and a ceiling-mounted delivery assembly 100. The ceiling-mounted delivery assembly 100 includes a conveyance system 102 bolted to a ceiling 12 of the cabin 10. The conveyance system 102 includes a housing 118 bolted to and extending from a ceiling of cabin 10. The conveyance system 102 includes a pair of guide rails 108 mounted to the housing 118 to provide the path for movement of a trolley, described below. Guide rails 108 can have a cross-section with an I-shape, a C-shape, and/or an L-shape. The twin guide rail 108 arrangement provides stability and avoids swaying effects. The assembly 100 includes the trolley 104 operatively connected to the conveyance system 102 for movement relative thereto. The trolley 104 includes a control box 106 having a pair of wheels 110. Each wheel 110 is operatively connected to a respective one of the pair of guide rails 108 to translate along the guide rails 108. The wheels 110 roll on the rails 108 and aid in forward to aft movement along an axis A, along an aisle of an aircraft, for example. The two wheel design provides lateral stability and avoids swaying because of non-uniform weight on the tray. The two wheel design is also more stable as compared to a single wheel design.

Figure 4:
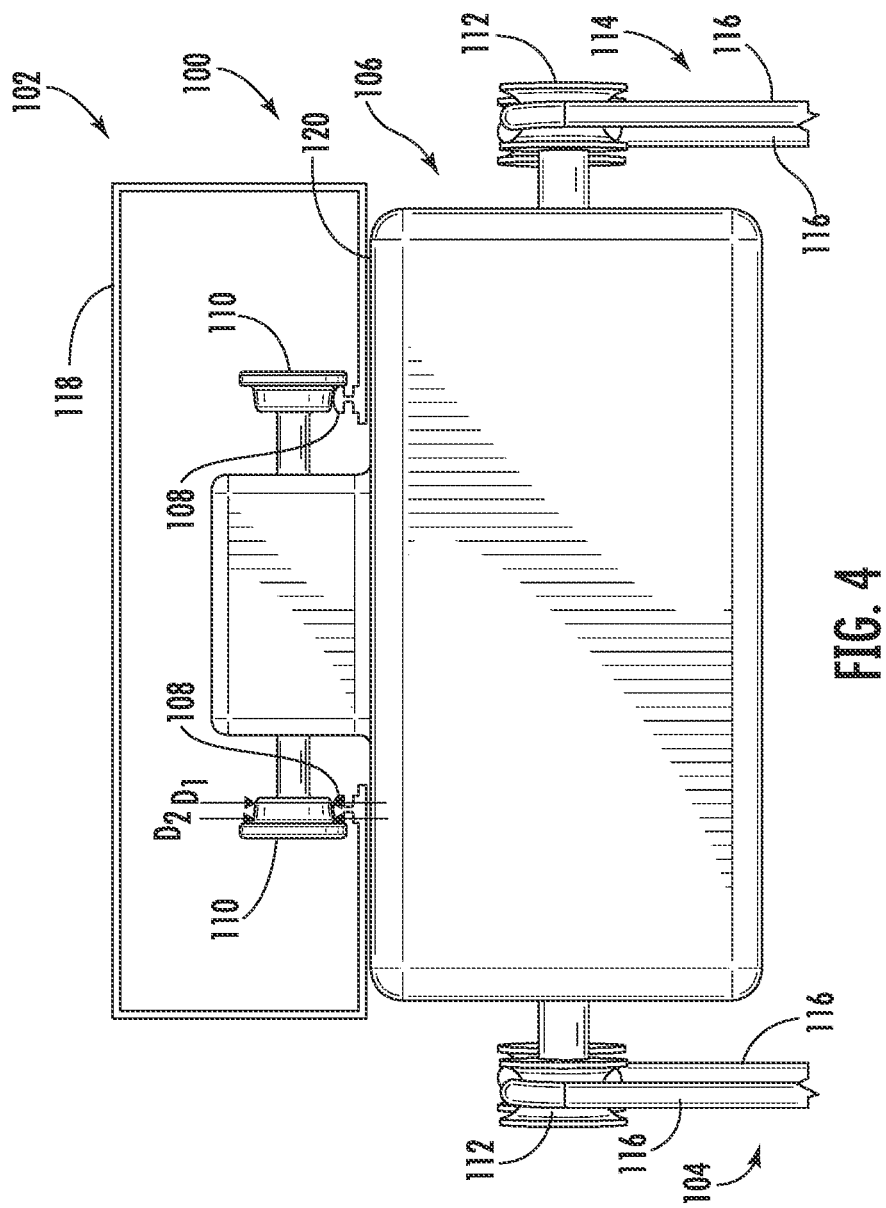
FIG. 4 is an enlarged schematic front plan view a portion of the trolley of FIG. 1 and the conveyance system of FIG. 2, showing the pulley drums.
Figure 5:
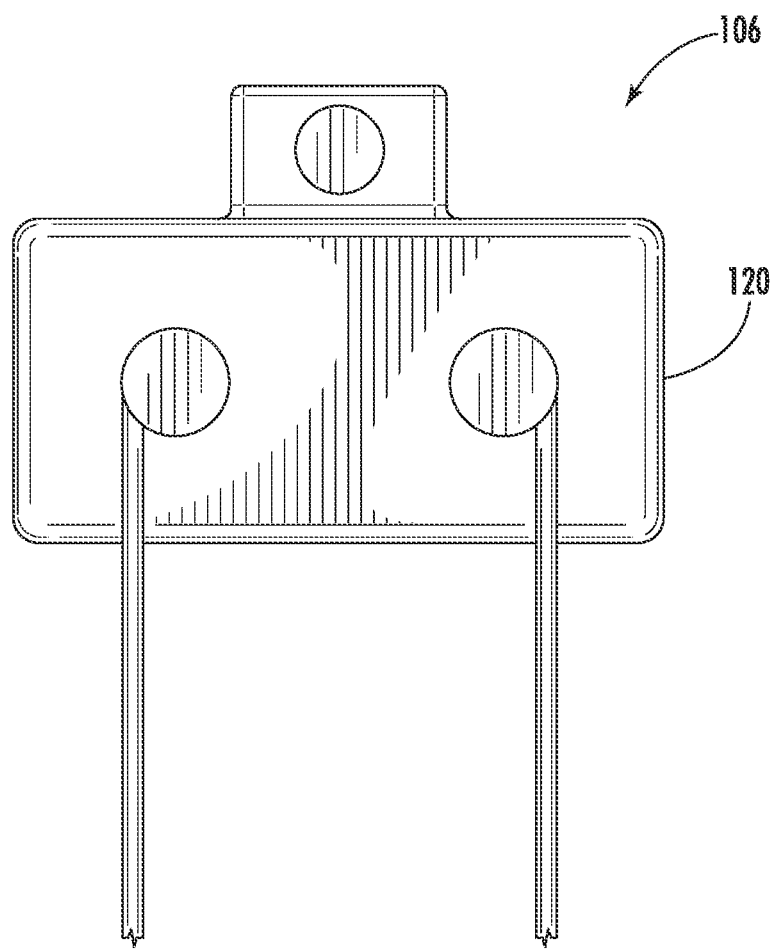
FIG. 5 is a schematic side plan view of a portion of the ceiling-mounted delivery assembly of FIG. 1, showing the pulley drums each having a cable in an extended position.
Figure 7:
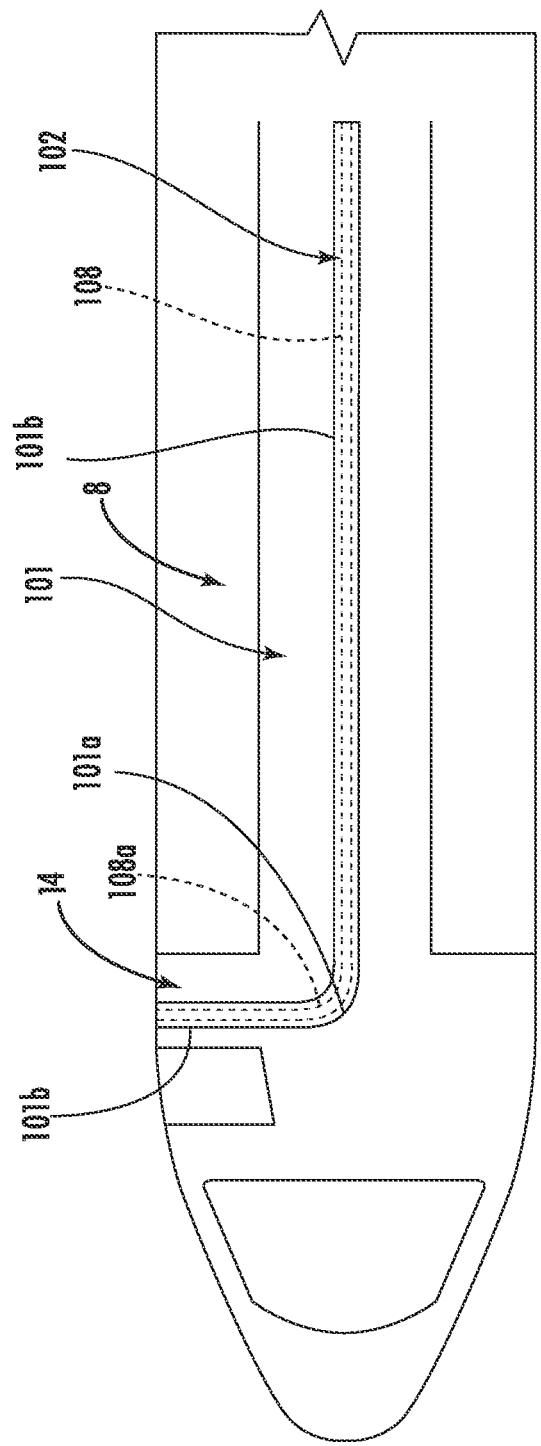
FIG. 7 is a schematic top plan view of a portion of the ceiling-mounted delivery assembly of FIG. 1, showing the track of the conveyance system on a single-aisle aircraft.

As shown in FIGS. 1, 4 and 7, the control box 106 includes a housing 120. The diameter of each wheel 110 of the trolley 104 is tapered from a small diameter $D_1$ to larger diameter $D_2$ in an outward direction relative to the housing 120. This tapering helps to assist with turning when a track 101 (shown in FIG. 7) formed by conveyance system 102 is curved. The advantage of having these tapered wheels is to eliminate the need of a differential gear while turning. Hence, the track 101 can be curved and connect the galley area 14 with the aisle area 8. In a single-aisle aircraft, the conveyance system 102 can form a track 101 with two linear segments 101b joined by an arcuate portion 101a. Accordingly, the pair of guide rails 108 includes arcuate portion 108a. The tapered wheel design helps the tray system to effectively turn on the curved rails 108 thereby making it suitable for routings to the galley and/or for use on multi-isle aircrafts.

As shown in FIG. 1, the control box 106 includes a plurality of pulley drums 112 extending therefrom. The trolley 104 includes cable connection system 114 having a plurality of cables 116. Those skilled in the art will also readily appreciate that ropes, re-tractable wires, or the like can all be used instead of cables. Each of the cables 116 includes a hook 140. The trolley 104 includes a tray 107 operatively connected to the cables 116 of the cable connection system 114 via the hooks 140 to be moved up and down relative to the control box 106. Each hook 140 is configured and adapted to removably connect to a respective portion of the tray 107. Each cable 116 is attached to a respective one of the pulley drums 112 of the control box 106 at one end and removably connected to the tray 107 at the other. Each cable 116 is configured and adapted to coil about its respective pulley drum 112 as the pulley drums 112 are rotated to retract the tray 107 upwards. The drums can rotate in both directions to control the up-down motion of the tray.

Figure 6:
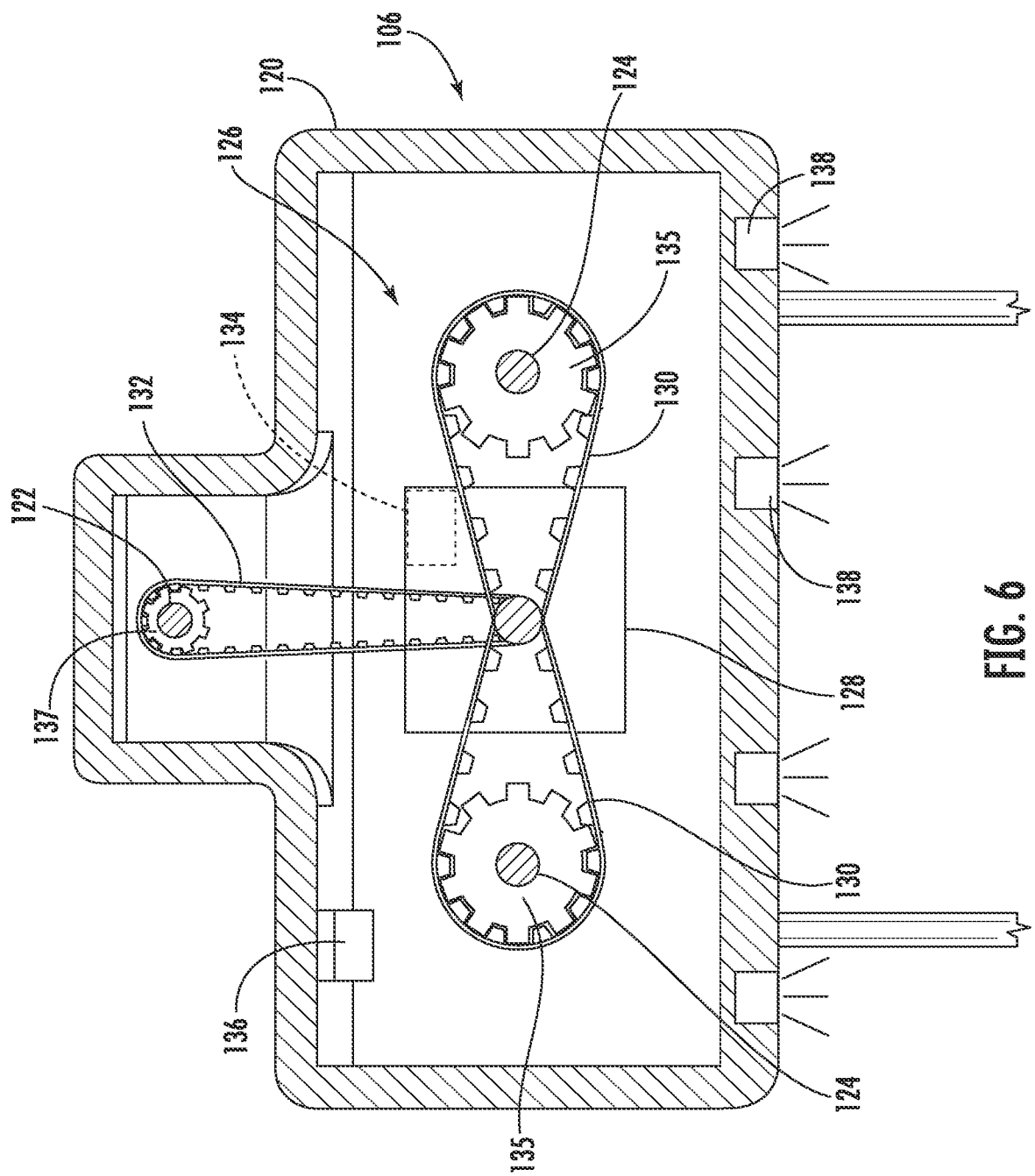
FIG. 6 is a schematic cross-sectional side plan view of the ceiling-mounted delivery assembly of FIG. 1, showing a portion of the drive assembly.

As shown in FIGS. 3 and 6, the control box 106 includes a drive axle 122 extending therethrough. Each wheel of the pair of wheels 110 is attached to an opposite end of the drive axle 122. The control box 106 includes a pair of pulley axles 124 extending through the housing 120. Each pulley axle 124 includes one of the pulley drums 112 at each end thereof. The control box 106 includes a drive assembly 126 operatively connected to at least one of the drive axle 122 or the pair of pulley axles 124. The drive assembly 126 is configured and adapted to drive the rotation of the drive axle 122 and/or the pair of pulley axles 124.

With reference now to FIG. 6, in some embodiments, the assembly 100 can be motorized to carry orders to the passenger autonomously. In such a scenario, the tray can be configured as per the requirements (passenger order) in the galley and then sent along the conveyance system 102. The drive assembly 126 includes an electric motor 128 and a transmission, such as belt drives 130, that engage with respective gears 135 on the pulley axels 124 for providing rotation thereto. Other transmission devices, such as gear drives, can also be used as transmission devices, depending on size requirements. The drive assembly 126 includes a wheel belt drive 132, which can also be another type of transmission device, such as gear drives. The wheel belt drive 132 is operatively connected to a gear 137 of the drive axle 122 for providing rotation thereto. The drive assembly 126 includes a motor controller 134 configured and adapted to control operation of the electric motor 128. The electric motor 128 is configured and adapted to drive the pulley axles 124 and the drive axle 122 at the same time, or the pulley axles and the drive axle 122 separately. For example, electric motor can include a multi-axel drive for driving the forward-aft movement of the control box 106 and up-down movement of the cables. The electric motor 128 is also configured and adapted to drive rotation in box directions.

Alternatively, the drive assembly 126 can include a second electric motor 128, such that one electric motor drives the drive axle 122 and the other drives the pulley axles 124. The drive assembly 126 includes a force sensor system 136 configured and adapted to detect abnormal G-forces. The force sensor system 136 is in electrical communication with the motor controller 134 such that when G-forces reach a given threshold, the tray 107 can be retracted upwards by winding up one or more cables 116 to preserve safety for passengers and crew and reduce likelihood of injury or damage during high-turbulence situations. The control box 106 includes ultra-violet (UV) lights 138. The UV lights 138 are mounted between the housing 120 and the tray 107. UV lights 138 may be commanded on after each time the tray 107 is retracted upwards to kill various viruses and bacteria on tray 107 in between uses. Alternatively, the UV lights can be customized to disinfect at the beginning or end of the flight or at the beginning or end of a food service, e.g., at beginning or end of serving a dinner meal, instead of after each tray retraction. Those skilled in the art will readily appreciate that the timing of the sanitization with UV lights is customizable depending on the application. The tray 107 can also be slotted to hold different food items securely, e.g., may include a cup holder, bowl holder, etc.

The methods and systems of the present disclosure, as described above and shown in the drawings, provide for ceiling-mounted delivery assemblies that are easier to operate/move along the aisle and is able to be raised-up/retracted by cables to allow passenger movement. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A ceiling-mounted delivery assembly for a cabin of a vehicle, the assembly comprising:
   a conveyance system including a pair of guide rails, wherein the conveyance system includes a housing bolted to and extending from a ceiling of a cabin wherein the guide rails are mounted to the housing;
   a trolley operatively connected to the conveyance system for movement relative thereto, the trolley including:
      a control box having a pair of wheels, each wheel operatively connected to a respective one of the pair of guide rails, and a plurality of pulley drums extending therefrom;
      a cable connection system including a plurality of cables, each cable attached to a respective one of the pulley drums of the control box; and
      a tray operatively connected to the cables of the cable connection system to be moved up and down relative to the control box.

2. The assembly as recited in claim 1, wherein each guide rail has at least one of an I-shape, an L-shape or a C-shape.

3. The assembly as recited in claim 1, wherein the each of the cables includes a hook, wherein each hook is configured and adapted to removably connect to a respective portion of the tray.

4. The assembly as recited in claim 1, wherein the control box includes a housing and a drive axle extending therethrough, wherein each wheel of the pair of wheels is attached to an opposite end of the drive axle.

5. The assembly as recited in claim 1, wherein the control box includes a housing and a pair of pulley axles extending therethrough, wherein each pulley axle includes one of the plurality of pulley drums at opposing ends thereof.

6. The assembly as recited in claim 1, wherein the control box includes a housing and a drive axle extending therethrough, wherein the control box includes a pair of pulley axles extending through the housing, wherein the control box includes a drive assembly operatively connected to at least one of the drive axle or the pair of pulley axles, wherein the drive assembly is configured and adapted to rotate at least one of the drive axle or the pair of pulley axles.

7. The assembly as recited in claim 1, wherein the control box includes a housing, wherein the pair of wheels of the trolley are tapered from small to large in an outward direction relative to the housing.

8. The assembly as recited in claim 1, wherein the pair of guide rails include at least one arcuate portion.

9. A ceiling-mounted delivery assembly for a cabin of a vehicle, the assembly comprising:
   a conveyance system including a pair of guide rails;
   a trolley operatively connected to the conveyance system for movement relative thereto, the trolley including:
      a control box having a pair of wheels, each wheel operatively connected to a respective one of the pair of guide rails, and a plurality of pulley drums extending therefrom;
      a cable connection system including a plurality of cables, each cable attached to a respective one of the pulley drums of the control box; and
      a tray operatively connected to the cables of the cable connection system to be moved up and down relative to the control box,
   wherein the control box includes a housing and a drive axle extending therethrough, wherein each wheel of the pair of wheels is attached to an opposite end of the drive axle.

10. A ceiling-mounted delivery assembly for a cabin of a vehicle, the assembly comprising:
    a conveyance system including a pair of guide rails;
    a trolley operatively connected to the conveyance system for movement relative thereto, the trolley including:
       a control box having a pair of wheels, each wheel operatively connected to a respective one of the pair of guide rails, and a plurality of pulley drums extending therefrom;
       a cable connection system including a plurality of cables, each cable attached to a respective one of the pulley drums of the control box; and
       a tray operatively connected to the cables of the cable connection system to be moved up and down relative to the control box, wherein the control box includes a housing and a pair of pulley axles extending therethrough, wherein each pulley axle includes one of the plurality of pulley drums at opposing ends thereof.

11. A ceiling-mounted delivery assembly for a cabin of a vehicle, the assembly comprising:
    a conveyance system including a pair of guide rails;
    a trolley operatively connected to the conveyance system for movement relative thereto, the trolley including:
       a control box having a pair of wheels, each wheel operatively connected to a respective one of the pair of guide rails, and a plurality of pulley drums extending therefrom;
       a cable connection system including a plurality of cables, each cable attached to a respective one of the pulley drums of the control box; and
       a tray operatively connected to the cables of the cable connection system to be moved up and down relative to the control box, wherein the control box includes a housing and a drive axle extending therethrough, wherein the control box includes a pair of pulley axles extending through the housing, wherein the control box includes a drive assembly operatively connected to at least one of the drive axle or the pair of pulley axles, wherein the drive assembly is configured and adapted to rotate at least one of the drive axle or the pair of pulley axles.

12. The assembly as recited in claim 11, wherein the drive assembly includes an electric motor and a pair of belt drives, wherein the pair of belt drives are operatively connected to the pair of pulley axles for providing rotation thereto.

13. The assembly as recited in claim 11, wherein the drive assembly includes an electric motor and a wheel belt drive, wherein the wheel belt drive is operatively connected to the drive axle for providing rotation thereto.

14. The assembly as recited in claim 11, wherein the drive assembly includes a motor controller and an electric motor, wherein the motor controller is configured and adapted to control operation of the electric motor.

15. The assembly as recited in claim 14, wherein the drive assembly includes a force sensor system configured and adapted to detect abnormal G-forces, wherein the force sensor system is in electrical communication with the motor controller.

16. A ceiling-mounted delivery assembly for a cabin of a vehicle, the assembly comprising:
  a conveyance system including a pair of guide rails;
  a trolley operatively connected to the conveyance system for movement relative thereto, the trolley including:
    a control box having a pair of wheels, each wheel operatively connected to a respective one of the pair of guide rails, and a plurality of pulley drums extending therefrom;
    a cable connection system including a plurality of cables, each cable attached to a respective one of the pulley drums of the control box; and
    a tray operatively connected to the cables of the cable connection system to be moved up and down relative to the control box, wherein the control box includes a housing, wherein the pair of wheels of the trolley are tapered from small to large in an outward direction relative to the housing.

17. A ceiling-mounted delivery assembly for a cabin of a vehicle, the assembly comprising:
  a conveyance system including a pair of guide rails;
  a trolley operatively connected to the conveyance system for movement relative thereto, the trolley including:
    a control box having a pair of wheels, each wheel operatively connected to a respective one of the pair of guide rails, and a plurality of pulley drums extending therefrom;
    a cable connection system including a plurality of cables, each cable attached to a respective one of the pulley drums of the control box; and
    a tray operatively connected to the cables of the cable connection system to be moved up and down relative to the control box, wherein the pair of guide rails include at least one arcuate portion.

18. A ceiling-mounted delivery assembly for a cabin of a vehicle, the assembly comprising:
  a conveyance system including a pair of guide rails;
  a trolley operatively connected to the conveyance system for movement relative thereto, the trolley including:
    a control box having a pair of wheels, each wheel operatively connected to a respective one of the pair of guide rails, and a plurality of pulley drums extending therefrom;
    a cable connection system including a plurality of cables, each cable attached to a respective one of the pulley drums of the control box; and
    a tray operatively connected to the cables of the cable connection system to be moved up and down relative to the control box, wherein the control box includes a housing and ultra-violet (UV) lights, wherein the UV lights are mounted between the housing and the tray.

19. A vehicle cabin comprising:
  a cabin ceiling; and
  a ceiling-mounted delivery assembly, the ceiling-mounted delivery assembly comprising:
    a conveyance system mounted to the cabin ceiling, the conveyance system including a pair of guide rails and a housing that forms a track in a cabin interior; and
    a trolley operatively connected to the conveyance system for movement relative thereto, the trolley including:
      a control box having a pair of wheels, each wheel operatively connected to a respective guide rail of the pair of guide rails, and a plurality of pulley drums extending from the control box;
      a cable connection system including a plurality of cables, each cable attached to a respective one of the pulley drums of the control box; and
      a tray operatively connected to the cables of the cable connection system to be moved up and down relative to the control box.

20. The vehicle cabin as recited in claim 19, wherein the track has at least one arcuate portion.

\* \* \* \* \*